United States Patent [19]

Hoeschele, Jr.

[11] 3,882,426

[45] May 6, 1975

[54] INCREMENT VARYING MEANS FOR INCREMENTAL ENCODER AND DECODER

[75] Inventor: David F. Hoeschele, Jr., Norristown, Pa.

[73] Assignee: General Electric Company, Fairfield, Conn.

[22] Filed: July 16, 1973

[21] Appl. No.: 379,435

Related U.S. Application Data

[63] Continuation-in-part of Ser. No. 361,598, May 18, 1973, Pat. No. 3,835,385.

[52] U.S. Cl. .............. 332/11 D; 325/38 B; 325/322; 329/104

[51] Int. Cl. .............. H03k 13/22

[58] Field of Search .............. 332/11, 11 D, 9 R, 9 T; 325/38 R, 38 B, 38 A, 322; 329/104

[56] References Cited

UNITED STATES PATENTS

| | | | |
|---|---|---|---|
| 3,339,142 | 8/1967 | Varsos | 325/38 B |
| 3,500,441 | 3/1970 | Brolin | 325/38 B X |
| 3,784,922 | 1/1974 | Blahut | 325/38 B X |

*Primary Examiner*—Alfred L. Brody

*Attorney, Agent, or Firm*—Allen E. Amgott; Raymond H. Quist; Henry W. Kaufmann

[57] ABSTRACT

In a digital incremental encoder or decoder for processing pulse signals whose logical significance indicates whether the time-varying amplitude information signal expressed by them has increased or decreased by more than a given quantum since the occurrence of the preceding pulse, the magnitude of the quantum is determined by an accumulating counter whose content is altered to approximate the absolute magnitude of the information signal amplitude change between successive pulses. By the present invention, the content of the accumulating counter is changed more slowly when the content is small than when it is large. This is done by permitting only a fraction of otherwise effective contentchanging control signals to affect the accumulating counter when its content is below a predetermined content.

5 Claims, 6 Drawing Figures

INCREMENT VARYING MEANS FOR INCREMENTAL ENCODER AND DECODER

The present application is related to an application by David F. Hoeschele, Jr. and John D. Zubas, Ser. No. 361,598 filed May 18, 1973 now U.S. Pat. No. 3,835,385.

BACKGROUND OF THE INVENTION

1. Field of the Invention:

This invention pertains to incremental or delta encoding and decoding means for expressing an information signal of time-varying amplitude as a series of pulses of binary logical significance.

2. Description of the Prior Art:

The prior art is highly varied in its approach. Cutler (U.S. Pat. No. 2,724,740) employs analogue variation of level, requiring analogue gain control devices of inverse characteristics, and depending upon similarity of such analogue devices at transmitter and receiver. Carbery (U.S. Pat. No. 2,889,409) employs essentially analogue means depending for accuracy upon the accuracy of a number of resistors, to secure a non-linear relation between the nominal numerical value of a six-bit binary code and the corresponding amplitude it represents. Phyfe (U.S. Pat. No. 3,151,296) encodes an amplitude-varying signal into a linearly related binary code of eight bits, and then employs a logic system to convert this into a nonlinearly related four-bit binary code.

Kaneko and Tomozawa (U.S. Pat. No. 3,496,465) teach incremental encoding, but operate upon the pulse output of the encoder by a cascade of multipliers to which direct-current potentials are applied before their output is decoded and fed back to the subtractor or comparison device conventional in digital encoders. Brolin (U.S. Pat. No. 3,500,441) provides compression at discrete levels, and transmits signals indicative of the compression level in time division with the encoded signals themselves. Brown (U.S. Pat. No. 3,609,551) provides a combination of analogue, or continuous compression, with a provision for changing the quantum level discretely when the incoming information signal falls below a predetermined low level. Goodman (U.S. Pat. No. 3,652,957) first converts incoming amplitude-varying information signals without compression into delta modulated pulse signals at a high clock rate (preferably an integral multiple of the clock rate of the delta modulated pulses ultimately to be produced). The high speed delta modulated pulses signals are then converted into multiple-bit digital representations which are processed for encoding at the low clock speed corresponding to the desired output signals. Schindler (U.S. Pat. No. 3,699,566) discloses a delta modulator in which the quantizing step level is varied according to one of two different exponential laws according as the signal is increasing or decreasing.

None of the prior art discloses a completely digital modulator operating completely at the frequency of the output pulses to be produced, with increments adapted continually in accordance with the existing signal characteristics, with no assumption of a particular law of variation.

SUMMARY OF THE INVENTION

This invention is an improvement of that described in referenced copending application, now U.S. Pat. No. 3,835,385 which is incorporated herein by reference and summarized in the Description of the Preferred Embodiment. Briefly, that invention is an incremental or delta encoder, and a generally similar decoder for signals so encoded. The encoder comprises a clocked comparator to which the incoming time-varying signal is applied, and compared with the stored value of the signal at the preceding clock pulse. If the incoming signal is greater than the previous value, the comparator produces an output of first logical significance; if it is smaller, the comparator produces an output of second logical significance. These comparator output signals are the incremental encoding of the incoming signal; in a particular instance, the amplitude of the first signal may be different from zero, and the amplitude of the second signal may be zero. The comparator output also causes an adder to add, or to subtract, according to whether it is of first or second logical significance, the content of a companding counter to or from the content of a storage register. Hence as the incoming signal varies from one clock (or sampling) period to the next, the content of the storage register is increased or decreased, and thus tends to approximate the current amplitude of the incoming signal. This digital value is converted by a digital-to-analogue converter into the analogue stored value of the previous value of the signal which is applied to the comparator. For best approximation of the encoded value to the actual value of the amplitude of the incoming signal, the content of the companding counter (which is the increment or quantum which can be added to or subtracted from the storage register in a single clock period) is adjusted continually to approximate the actual change in incoming signal amplitude during a clock period. For this purpose, three successive comparator outputs of the same logical sense increase the companding counter content by one; and six signals of alternating logical sense decrease the companding counter content by one. The decoder disclosed in the referenced copending application is similar to the encoder, except that it has no comparator. Incoming encoded signals such as are produced by the encoder are applied to the adder, and affect the counting of the companding counter, exactly as in the encoder, and the content of the storage register is converted to its analogue equivalent, which is the decoded output.

While the invention thus far described is completely operative, it is limited somewhat in its ability to follow large rapid variations in amplitude of the signal followed by a decrease to small or slow variations because the companding counter is stepped at most only one digit per clock period. If such an increment is adequate for small variations (responsively to which the companding counter will have been stepped down to a small content), it will be inadequate for large variations, and vice-versa. The present invention discloses means for providing several different rates of stepping the companding counter. Specifically, the content of the most significant digits of the companding counter is used to determine the stepping rate of the companding counter. If no units appear in the four most significant of the seven digits of the companding counter (as described in the preferred embodiment) its content will be changed in the appropriate direction only at every third clock pulse; but if a unit appears in any of the four most significant bits, its content will be changed at every clock pulse, so long as the comparator signals continue to be of the same logical sense after the requisite sequence of three pulses of that sense. Thus to a two-level approximation the companding counter content is changed at more nearly a constant percentage of its content. This results in better following of both rapidly varying and slowly varying signals, with superior accuracy of reproduction by the similarly equipped decoder of the signals originally encoded by the encoder.

This approach may be generalized to cause the absence of 1 outputs in the five most significant bits to permit only every fourth clock pulse (at a maximum) to step the companding counter. A 1 bit in the fourth or fifth most significant stages will permit every second clock pulse (at a maximum) to step the companding counter, and a 1 in any of the three most significant stages will permit the companding counter to be stepped at every clock pulse.

A somewhat specialized modification of the last described method permits a 1 in the second or third most significant stage of the companding counter to cause the companding counter to be stepped at the clock rate; but a 1 in the most significant stage of the companding permits stepping pulses at the clock rate to be applied to step the second least significant stage of the companding counter, thus achieving stepping of the companding counter at effectively double the clock rate. This necessarily destroys the significance of the content of the least significant stage of the companding counter, but the resulting error will be small.

DESCRIPTION OF THE PREFERRED EMBODIMENT

Figure 1:
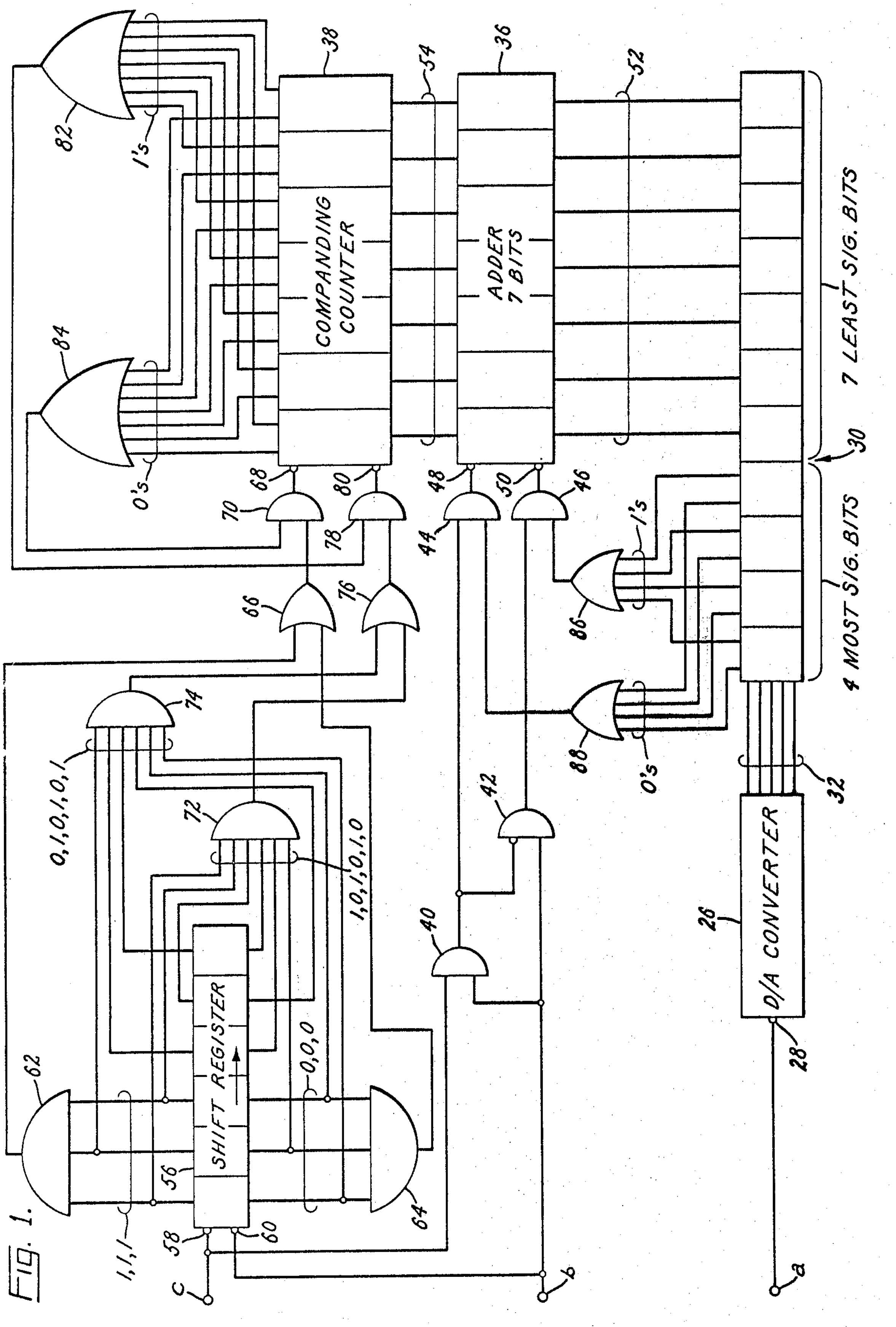
FIG. 1 represents an embodiment of the invention of the referenced Copending application.
Figure 2:
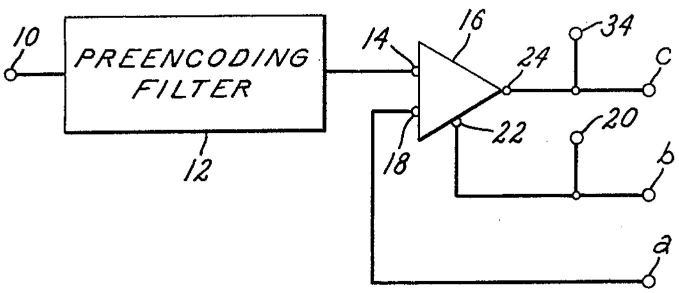
FIG. 2 represents the additional equipment suitable for use of the invention in an encoder.

FIGS. 1 and 2, with their respective lettered connection points connected together (*a*, to *a*, *b* to *b*, and *c* to *c*) represent the transmitting or encoding portion of the preferred embodiment of copending U.S. Pat. No. 3,835,385. An incoming information signal to be encoded is applied to terminal 10 by a source not represented whence it is passed through and filtered by preencoding filter 12 to adjust its spectral distribution to attenuate noise, correct frequency distortion engendered in the source, provide preemphasis or any other of the many purposes standard in the art. The filtered signal is applied to input terminal 14 of comparator 16, whose other input terminal is 18. A clock pulse is supplied at terminal 20 from a source not represented since abundant in the art, and fed inter alia to terminal 22 of comparator 16. The output appearing at terminal 24 of comparator 16 is a binary function of the relative magnitude of signals appearing at terminals 14 and 18, and has significance only during the appearance of a clock pulse. By way of convention, if the input to terminal 14 is greater than the input (the feedback) to terminal 18, a positive output, designated logically as 1 will appear at terminal 24 during the clock pulse; if the signal input to terminal 14 is less than the feedback to terminal 18, the output will be logically 0. The 0 may actually be zero, in which case certain other apparatus must be fed clock pulses from terminal 20 in order that the existence of the 0 may be known. This is done in the present embodiment. If the 0 signal is actually a negative output, it can be identified without an auxiliary clock pulse. In a simple embodiment, comparator 16 may comprise a differential amplifier with its output gated by the clock pulse at terminal 22.

Figure 3:
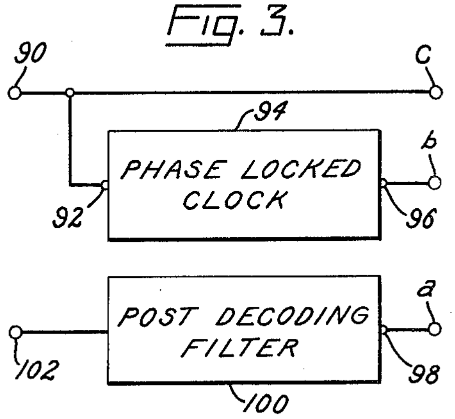
FIG. 3 represents the additional equipment suitable for use of the invention in a decoder.

The feedback to terminal 18 is supplied by a digital-to-analogue (D/A) converter 26 from terminal 28, whose output is an analogue value of the digital content of register 30, whose most significant stages are connected by channels 32 to D/A converter 26. Register 30, in normal operation, is caused to contain an approximation to the most recent value of the filtered signal at terminal 14. Thus the signal appearing at terminal 24 of comparator 16 at each clock pulse is indicative of the sign of the difference between the current value of the filtered incoming information signal and the approximation to its most recent previous value. Thus the signal at terminal 24 is in fact the delta- or incrementally modulated form of the filtered incoming information signal. As such it is fed to terminal 34, whence it may be transmitted by any known means to a receiving point provided with decoding equipment, of which an embodiment is represented by FIGS. 1 and 3 with their lettered terminals connected (*a* to *a*, *b* to *b*, *c* to *c*).

The content of register 30 is updated at the clock frequency by addition or substraction, by means of adder 36, of the content of companding counter 38. Adder 36 is conveniently and preferably a parallel rather than a serial device. (As with the other single lines representing connections, the lines to adder 36 will in an actual adder comprise several conductors as the adder design dictates.) The output terminal 24 of comparator 16 is connected as one input of AND gate 40, whose other input is the clock pulse supplied from terminal 20. Thus if at the occurrence of a clock pulse there is a 1 output at terminal 24, gate 40 will produce an output. This output is connected to inhibit gate 42, whose other input is also the clock pulse, so that the existence of a 1 output from comparator 16 produces an output from gate 40 and inhibits an output from gate 42. If, however, at the occurrence of a clock pulse, there is a logical 0 at terminal 24, represented in fact by zero output voltage at terminal 24, there will be no output from gate 40; gate 42 will not be inhibited, and the clock pulse will pass through gate 42. The output of gate 40 also is applied to gate 44, which is normally open except under certain conditions to be described later; if gate 44 is open, the output of gate 40 reaches terminal 48 of adder 36 and causes it to add the content of companding counter 38. If gate 40 does not produce an output (because the output of comparator 16 is a logical 0) then gate 42 will produce an output which will normally pass through gate 46 to terminal 50 of adder 36 and cause it to subtract the content of companding counter 38 from the content of register 30. Thus if the output of comparator is a 1, showing that the incoming information signal has increased above the previous approximation stored in register 30, then adder 36 adds the content of companding counter 38 to the contenter of register 30; if the output of comparator 16 is a logical 0, then adder 36 subtracts from the content of register 30 the content of companding counter 38. Thus the content of companding counter 38 is the quantum value by which the approximation stored in register 30 is changed. The operation of adder 36 does not clear the companding counter of its content, as would be done in certain arithmetic computers employing parallel adders; the content of companding counter 38 is changed only by other means adapted to cause its content to approximate as well as may be the finite difference between successively sampled (or clocked) value of the information signal. It is noted that adder 36 is connected by a plurality of channels 52 to register 30 and by a plurality of channels 54 to companding counter 38. The number of channels is shown as equal to the bit capacity of companding counter 38, it being assumed that register 30 has internal provision for transmitting carries to its more significant stages.

The content of companding counter 38 is controlled by a logic unit, which in the preferred embodiment comprises a 6-bit shift register 56 having an input terminal 58 connected to terminal 24 of comparator 16, and a clock input terminal 60 connected to terminal 20. The 1 outputs of the first three stages of register 56 are connected to AND or coincidence gate 62, and the 0 outputs of the same first three stages of register 56 are connected to AND or coincidence gate 64. The outputs of gates 62 and 64 are connected by OR or buffer gate 66 to UP terminal of companding counter 38 via gate 70 which is normally open. If, and only if, three successive outputs of comparator 16 have all been 1 or have all been 0, the content of companding counter 38 will be increased by one digit. Such a consistent succession of bits indicates a consistent trend to an increased absolute difference between successive samples of the filtered signal at terminal 14, so that the quantum value of 38 should properly be changed so that each operation of adder 36 will change the content of register 30 by an increased amount. This amounts to saying that the dynamic range between successive clock or sample pulses is increased. It should be noticed that, since adder 36 can either add or subtract, it is permissible to use successive 1 and successive 0 signals in the same way to alter the content of companding counter 38; its content is an absolute value without sign.

The means for increasing the quantum increase (or decrease) in register 30 by increasing the content of companding counter 38 has been described; and this will obviously be too great if the rate of change of the filtered signal at terminal 14 decreases. The effect of too high a quantum will be that the system will "hunt." A 1 signal will make the content of register 30 too great; a resulting 0 signal will make it too low, and the cycle will be repeated. Thus a series of signals at terminal 24 of the form 1, 0, 1, 0. 1. 0 will constitute definite indication of a strong probability that companding counter 38 is providing too great a quantum. To provide for this eventuality, alternate 1 and 0 outputs from successive stages of shift register 56 are connected as inputs to AND or coincidence gate 72, and the complementary outputs from the same stages — alternate 0 and 1 outputs are similarly connected to AND gate 74. The outputs of gates 72 and 74 are connected as inputs to OR or buffer 76, whose output is connected via normally open gate 78 to terminal 80 of companding counter 38, which is the DOWN terminal; each pulse applied to terminal 80 will decrease the content of companding counter 38 by one digit. Since signals cannot pass gate 62 or 64 and gate 72 or 74 simultaneously, there is no danger that signals will appear simultaneously at terminals 68 and 80 of 38; it will never be ordered to increase and decrease simultaneously. For convenient reference, shift register 66, gates 62, 64, 72, and 74 and buffers 66 and 76 may be considered as substantially comprising the logic unit, although necessary auxiliaries will be understood to be intended also.

One additional consideration requires specification. Companding counter 38 and register 30 must not be permitted to overflow in either direction— that is, to pass increasingly through their maximum content to zero, or to pass decreasingly through their zero content to their maximum content. This is done for companding counter 38 by buffing together by OR gate 82 all the 1 outputs of the counter stages and using the buffed output to gate via gate 78 the DOWN input, so that no down count can occur unless there is at least one 1 stored in the counter 38. Similarly, all the 0 outputs of the counter stages are buffed together by OR gate 84, and the buffed output is applied to gate 70 to gate the UP input, so that no up count can occur unless there is at least one 0 in the counter. This simple procedure is effective in the companding counter 38 because it can be stepped only one digit at a time, and hence a single 0 or 1, as the case may be, will show room for one more digit without overflow. But register 30 ordinarily receives, positively or negatively, the entire content of companding counter 38 via adder 36; and it may have some 1 and some 0 content and yet be in a condition where addition would cause it to overflow. It is possible, using known art, to provide various comparison devices to determine absolutely whether an operation of adder 36 would cause overflow; for example, a duplication of register 30 might be included to receive the output of adder 36, and transfer the auxiliary register's resulting content to register 30 only if there had been no overflow. Practical considerations offer a simpler solution. The maximum content of companding counter 38 will reasonably be made appreciably smaller than that of register 30; there would be no point to having companding counter 38 capable of changing the content of register 30 from zero to its maximum in one clock pulse. In the embodiment described, companding counter 38 has seven binary stages (giving a range of increments of about 40 db) and register 30 has eleven binary stages. The 1 outputs of the four most significant stages of register 30 are buffed together by OR gate 86 at gate 46 the subtraction command to terminal 50 of adder 36, and the 0 outputs of the same stages are buffed together by OR gate 88 to gate at gate 44 the addition command to terminal 48 of adder 36. No overflow can occur. However, this will also inhibit additions or subtractions of increments from companding counter 38 which are so small that their addition or subtraction would not cause overflow — that is, so small that they would produce no positive or negative carry to the array of the four most significant digits (MSD's) of register 30. This does not effectively impair the accuracy of the operation of register 30, but rather slightly restricts its effective range. If the four MSD's of register 30 are all 0, addition to the seven least significant digits (LSD's) will be permitted, but not subtraction from them. This process must ultimately force a 1 into one of the four MSD's, and permit addition to or subtraction from the remaining seven LSD's. Similarly, if all four MSD's contain 1, subtraction from the seven LSD's will be permitted, but not addition to them, and ultimately a 0 will appear in at least one of the four MSD's. Thus approach to overflow in either direction will stop further motion of the content of register 30 to overflow at a value slightly before the theoretical limit. However, since the four MSD's give a least count of 1/32, or a discrimination of about 3 percent of maximum, this restriction of range is not serious, particularly since the discrimination may be halved by each additional stage or register 30, which will in practice be an inexpensive integrated circuit unit in which additional stages will be of trivial cost.

Along similar lines, the D/A converter 26 need not be connected to more of the MSD's than is necessary to provide the desired accuracy of conversion. Since eleven binary stages correspond to a registration of 2047, or a potential discrimination between available steps of amplitude of about 0.05 percent, it is improbable that one would connect the last few least significant stages to the D/A converter 26, in most practical cases. Five channels 32 are shown by way of exemplifying that all of the most significant stages of register 30 which are in excess of the number of stages of companding counter 38 and some, but not all, of the less significant stages may be so connected. If it is desired to secure accurate inclusion of comparatively low amplitudes represented by the less significant stages, they may, of course, be connected to D/A converter 26.

FIGS. 1 and 3, with their respective lettered connection points connected together (*a* to *a*, *b* to *b*, and *c* to *c*) represent a decoder for signals encoded by the embodiment represented by FIGS. 1 and 2, connected together at their respective lettered connection points as described. Since it is generally true that, to decode encoded matter, it is necessary to apply the algorithms used in encoding, the decoder strongly resembles the encoder. This resemblance is heightened by the generally closed-loop organization of the encoder which includes the production by D/A converter 26 of an analogue representation of the encoded signal as represented by the content of register 30. The consequent identity in both the encoder and the decoder of the apparatus represented by FIG. 1, with lettered connection points *a*, *b*, and *c* to show how it may be connected to the identically lettered connection points, either of the encoding components represented in FIG. 2, or of the decoding components represented in FIG. 3, permits economy of description.

In FIG. 3, terminal 90 is connected by means not shown to receive the signals provided at terminal 34 of the encoder represented in FIGS. 1 and 2. These means will be wire or radiative channels in conventional applications, but could be e.g. mechanical pulses in some extraordinary application provided the mechanical pulses were converted into electrical for application to terminal 90. The signals at terminal 90 are connected via pont c to terminal 58 of shift register 56 and gate 40. Terminal 90 is also connected to terminal 92 of a phaselocked clock 94 whose output terminal 96 is connected to the clock pulse line of FIG. 1 via point *b*. Phase locked clock 94 is designed to operate at the same frequency as the clock source connected to terminal 20 in the encoder embodiment of FIGS. 1 and 2. It is phase locked with the incoming signals received at terminal 90 from terminal 34 to insure its synchronism not only in frequency but in phase with the clock signals in the encoder. Since signals from terminal 34, and consequently at terminal 90, may be logical 1 or 0, and since a logical 0 may be an actual zero amplitude — an omitted pulse — the phase locked clock must have sufficient stability to remain adequately in phase when 0 signals occur. This is well within the skill of the known art. An alternative to transmit a clock pulse separately from the transmitting station associated with the encoder; this will be particularly applicable if the transmitting station provides a number of encoded channels all of which can rely upon the transmission of a single standard of clock pulse frequency and phase. If it be assumed momentarily that the content of the various bit stores in the decoder is identical with that of the identical bit stores in the encoder when operation is begun, it is evident that register 30 will contain a digital representation of the amplitude of the encoded signal, and the D/A converter 26 in the decoder will provide at its terminal 28 an analogue equivalent of the digital representation. In FIGS. 1 and 3, terminal 28 is represented connected to input terminal 98 of a postdecoding filter 100, at whose output terminal 102 the decoded representation of the signal originally incoming at terminal 10 of FIG. 2 will be available.

Postdecoding filter 100 is provided to alter the frequency spectrum of the decoded signal from D/A converter 26 in the inverse of any distorting characteristic of preencoding filter 12 — that is, for example, to restore any preemphasized or deemphasized information frequencies to their proper amplitudes. It is not necessarily completely the inverse in its transmission characteristics of preencoding filter 12; if, for example, filter 12 is designed to attenuate a particular frequency band in the incoming information signal at terminal 10 because that band has an excessively high noise content and negligible information content, one would not design postdecoding filter 100 so it would restore the noisy band to its original amplitude. The use of both of these filters 12 and 100 is a matter of design choice; they are shown for completeness of the preferred embodiment, not because they are essential to the invention.

A final consideration of theory remains which has two aspects. Noise or interference pulses may put the registers of the decoder out of agreement with the identical registers in the decoder; or at the beginning of operation they may not initially be in agreement. Since delta or incremental modulation involves what is essentially integration at the decoding apparatus, disagreement between the content of the two registers 30 of the encoder and the decoder will amount to a difference in the constant of integration which will not change the shape of the reproduced wave. Ordinarily the wave shape in what conveys the information in the signal; even in television, the "black" level is transmitted only relative to other signal components, and is given an absolute value by the d-c restorer at the receiver. So if the registers 30 at both ends of the channel are not in agreement, they will change relatively to their previous content until one of them is in danger of overflow. The register 30 in danger of overflow will then "mark time" or "slip" until it is ordered by its controls to back away from the bound it has reached. But the clock frequency employed to sample the incoming signal in the encoder and to adjust the output amplitude in the decoder is considerably higher than the maximum information signal frequency component to be reproduced. In the preferred embodiment, for voice communication, it is selected at 40 kHz. Thus the recovery from the "mark time" condition will normally be rapid, and has a high probability of producing an error in the reproduced signal at the decoder output which will lie largely outside of the information signal band.

The question of disagreements between the two companding counters is similarly self-solving. Whenever the incoming information signal applied to terminal 10 of the encoder reaches an amplitude value at which its rate of change is nearly zero, the required increment provided by companding counter 38 in the encoder will be nearly zero, so its count will be rapidly reduced by pulses applied to its terminal 80. The identical logic in the decoder will cause its companding counter 38 also to be stepped down. Since in usual information signals, as for example in voice communication, there are frequent pauses as between syllables, this phenomenon produces adequate correspondence between the two companding counters 38 in the encoder and the decoder.

The preceding describes the substance of copending Ser. No. 361,598, now U.S. Pat. No. 3,835,385, which is useful in understanding the present invention.

Figure 6:
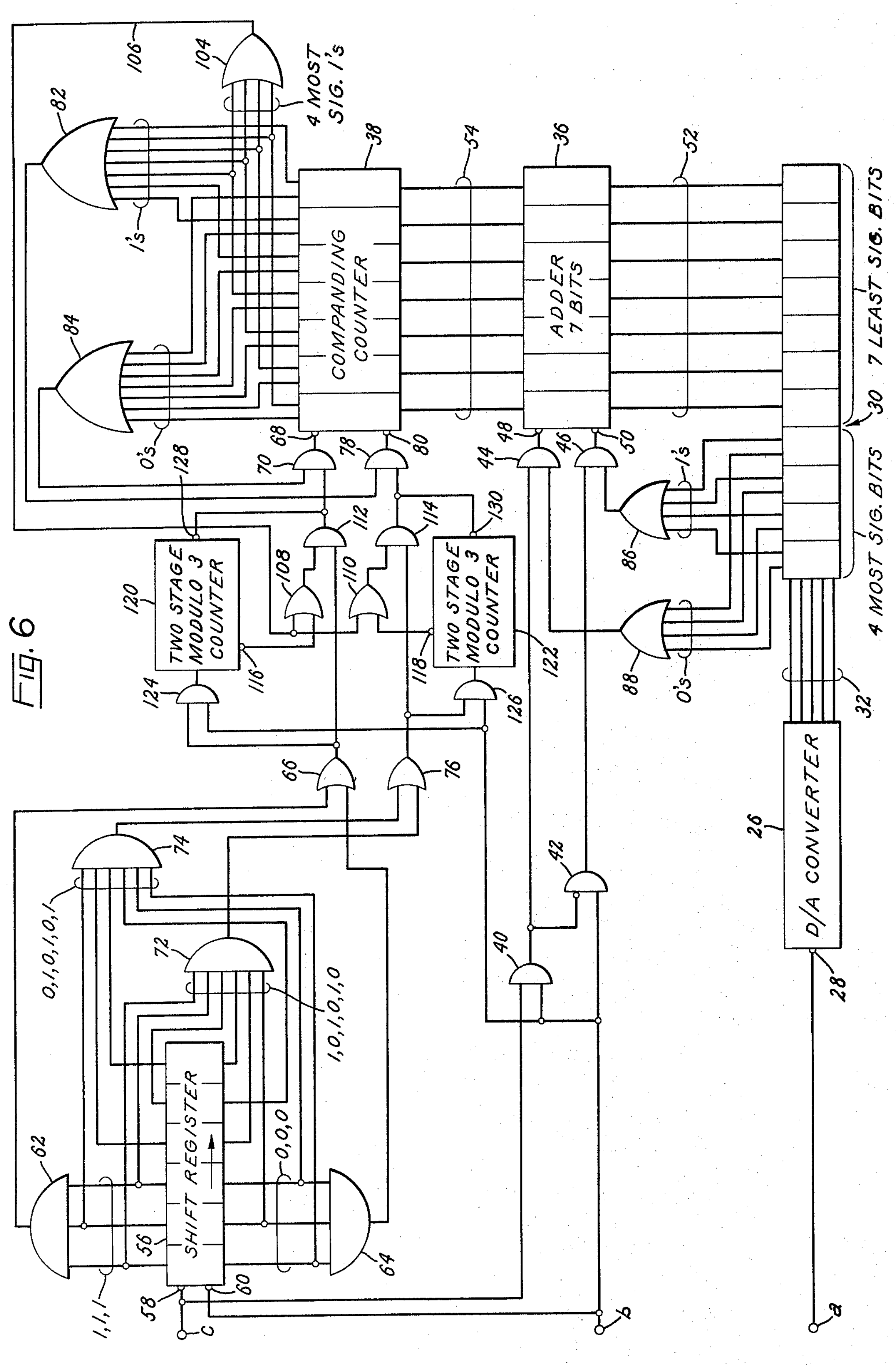
FIG. 6 represents an embodiment of the present invention, with necessary ancillary equipment.

FIG. 6, in its references numbered up to and including 88, is identical with FIG. 1;

In FIG. 1, the output of buffer 66 is fed directly as an input to gate 70; and the output of buffer 76 is fed directly as an input to gate 78. These connections insure that, so long as there is no danger of overflow, companding counter 38 will be stepped up one count in content for each pulse beyond the second in a sequence of pulses of the same logical significance; that is, a sequence of N "1'" or "0's " will step the counter 38 up N-2 times. Similarly, for each pulse beyond the fifth in a series of pulses of alternating logical significance, companding counter 38 will be stepped down in content by one count; that is, a sequence of N pulses "0,1,0,1,0,1,0,1,0... " will step the counter 38 down N-5 times. As has been explained in the preceding, this, while satisfactory, may be improved by altering the rate of stepping companding counter 38 in accordance with its existing stored content.

In FIG. 6 the presence of a "1 " in any of the four most significant bits of the content of companding counter 38 is taken as a ground for permitting the counter to step once for each pulse at the output of buffer 66 or 76. This criterion is established physically by buffer 104, whose inputs are the 1 outputs of the four most significant bits of companding counter 38, so that the existence of a 1 in any of those four bit positions will produce a signal at output conductor 106. Output conductor 106 extends as an input to buffers 108 and 110, which provide inputs to gates 112 and 114, respectively. When gates 112 and 114 are opened by inputs from buffers 108 and 110, respectively, they serve merely to connect the output of buffer 66 to an input of gate 70, and the output of buffer 76 to an input of gate 78. This situation merely duplicates the effect of the permanent connection of buffer 66 to gate 70, and of buffer 76 to gate 78 which obtains in FIG. 1.

The effect of the present invention improvement appears when there are no 1's in the four most significant bits of companding counter 38, there is no signal on output conductor 106, and outputs of buffers 108 and 110, essential to the stepping of counter 38, must come, respectively, from output terminals 116 and 118 of two-stage binary counters 120 and 122. These counters are connected to count modulo three. Gate 124 is connected to receive clock pulses via terminal *b*, and to pass them to be counted by counter 120 only when there is an output from buffer 66. Similarly gate 126 is connected to receive clock pulses from terminal b and pass them to be counted by counter 122 only when there is an output from buffer 76. The output of gate 112 is fed to the reset terminnal 128 of counter 120, and the output of gate 114 is fed to the reset terminal 130 of counter 122. Thus each time a stepping pulse appears as an output of either of gates 112 or 114, the associated counter 120 or 122 is reset to 00. If there is a signal on output conductor 106 (as was initially assumed), this reset will occur at every pulse from buffer 66 or 76 without any particularly noteworthy result. However, if (as the first sentence of this paragraph provides) there is no signal on output conductor 106, after a pulse from buffer 66 has passed gate 112 to step counter 38, associated counter 120 will have been reset via terminal 128 to 00. There will be no output terminal 116 to buffer 108 until counter 120 has received from buffer 66 through gate 124 enough pulses to step it to a 1,0 state, at which time the output from terminal 116 through buffer 108 will open gate 112 to a pulse from buffer 66, and permit that pulse to step counter 38. The passage of that pulse through gate 112 will, of course, reset counter 120 to 00 and repeat the cycle, unless it should be interrupted by the appearance of a 1 in one of the inputs to buffer 104.

Similarly outputs from gate 114 reset counter 122 to 00, and pulses from buffer 76 can pass gate 114 only after a sufficient number of such pulses have passed gate 126 to step counter 122 to the 1,0 condition.

The diagrams and description have been in positive terms; that is, AND and OR gates, also known as coincidence gates and buffers, have been shown. Certain practical considerations of equipment performance, particularly of semiconductor devices, have resulted in the commercial availability of devices with complemented outputs, of which the so-called "NAND" gate is a prime example. The use of these devices in embodying positively expressed logic is well known, and is described, for example, in the Integrated Circuits Catalogue of the Texas Instrument Company. However, the description of the functioning of the device is far more readily understood in positive recital. Similarly, the simultaneous application of clock pulses has been implied. The finite response time of actual devices may require that the application of e.g. a clock or stepping pulse be delayed until certain control gates have been completely altered in condition. Since the actual delays required will be a function of the speed of operation of the particular components used, it is not feasible to express them directly; but, since provision of such delays is a part of the well known art of the logical designer, it is not necessary to do so.

Figure 4:
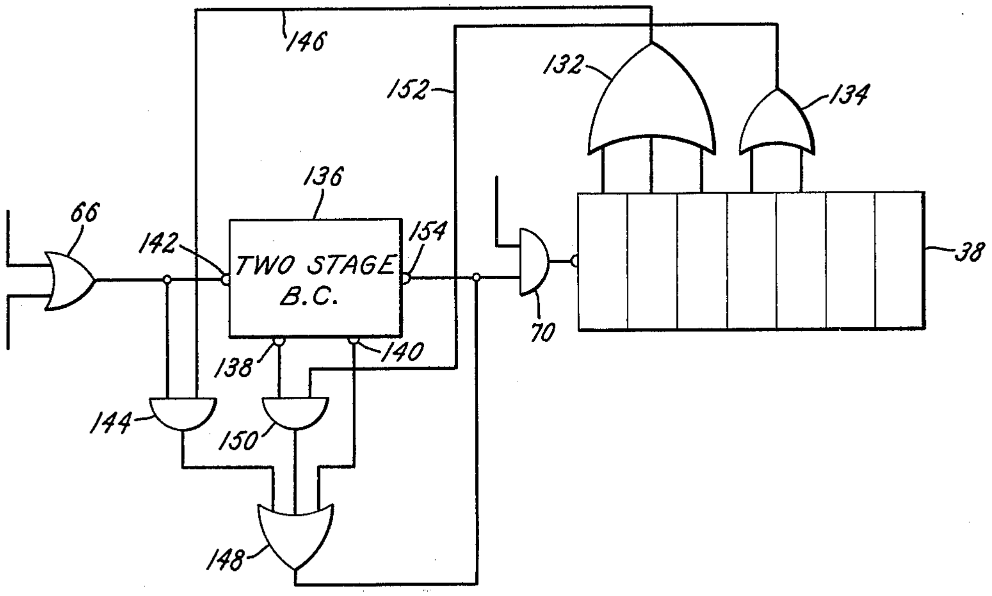
FIG. 4 represents an alternate embodiment of the present invention.

A somewhat more elaborate embodiment of my invention is represented by FIG. 4. For simplification and readier explanation of this aspect of the invention, only the reference items essential to the explanation of this particular embodiment have been included. Thus, while companding counter 38 is represented, buffers 82 and 84 (which serve as part of the overflow prevention means) are not shown, and similarly the connections 54 to adder 36 are omitted, although they, like all of the reference items numbered below 104 in FIG. 6 of the present application, must be understood to be present. In FIG. 4, the 1 outputs of the three most significant digits of companding counter 38 are connected to buffer 132, and the two next most significant digit 1 outputs are connected to buffer 134. Two-stage binary counter 136 has an output terminal 138 from its first stage, and an output terminal 140 connected to the output of its second stage. The output of buffer 66 (whose inputs are as in FIG. 6) is connected to the input terminal 142 of binary counter 136, so that every second pulse from buffer 66 will produce an output terminal 138, and every fourth pulse from buffer 66 will produce an output at terminal 140. The output of buffer 66 is also connected to one input of gate 144, whose other input, via conductor 146, is the output of buffer 132.

Thus, if there is a 1 stored in any of the three most significant digit stages of companding counter 38, every pulse from buffer 66 will be passed through gate 144 to buffer 148 and thence to the input of gate 70. Whose other input is connected as represented in FIG. 6. If, however, there are no 1 outputs to buffer 132 from the three most significant digit stages of companding counter 38, but there is a 1 output in the fourth or fifth most significant digit stages, which are inputs to buffer 134, gate 150 will be opened by the output of buffer 134 via conductor 152, and the output of terminal 138 will provide a pulse for every second output of buffer 66. This output will pass via buffer 148 to gate 170, and counter 38 will be stepped at one-half the rate of the outputs from buffer 66. If none of the five most significant stages of companding counter 38 contain a 1, then gates 144 and 150 will be open, since there will be no output from buffer 132 or buffer 134. In that case, the output from terminal 140 of binary counter 136 will produce an output for every fourth output pulse from buffer 66, which output from terminal 140 will pass through buffer 148 to the input of gate 70.

FIG. 4 represents only the application of this particular embodiment to the interconnection of buffer 66 to gate 70. A strictly similar chain of equipment may be used to interconnect the output of buffer 76 to the input of gate 78.

The description of FIG. 4 makes clear that three different stepping or counting rates for companding counter 38 are provided, depending upon the magnitude of the value it stores. It is evident that buffers 132 and 134, and gates 144 and 150, with buffer 148 constitute in their totality a simple function table whereby the stored content of companding counter 38 is caused to determine the effective count of binary counter 136, since the output of buffer 148 is connected to reset terminal 154 of binary counter 136, and its effective total count is thus controlled by the signals in the various stages of companding counter 38. The degree of fineness by which the rate of stepping companding counter 38 can be controlled is thus limited only by the number of its stages which are connected to the function table and the number of stages of binary counter 136. This possibility, in general, exceeds the requirements for most input signals, and so such extremes would generally not be preferred, except where unusual signal characteristics required unusual refinement.

Figure 5:
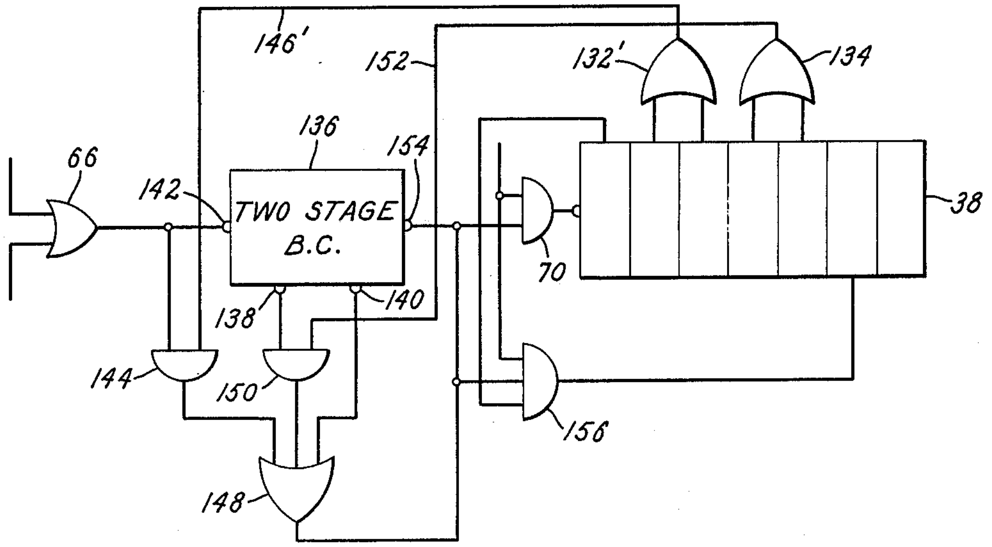
FIG. 5 represents an alternate embodiment of the present invention.

The rate of stepping companding counter 38 is limited by the clock rate, which is maximum possible rate of output signals from buffer 66, even when, in FIG. 4, an output from buffer 132 enables gate 144 and permits every output signal from buffer 66 to pass gate 70, via buffer 148, and step counter 38 at every clock pulse. This sets an absolute limit to the rate of changing the count of companding counter 38. For extraordinary situations where a faster rate of change is desired, the modification of FIG. 4 represented by FIG. 5 is applicable. This is substantially similar to the representation of FIG. 4; but buffer 132', unlike buffer 132 of FIG. 4, is connected to receive only the second and third most significant 1 outputs of companding counter 38. The most significant 1 output is connected to a separate three-input gate 156, two of whose inputs are connected in parallel with the two inputs to gate 70. However, the output of gate 156 is connected to the stepping input of the second least significant stage of companding counter 38. Thus if there is a 1 in the output of the most significant stage of companding counter 38, the pulses which pass through gate 70 to step the least significant stage will also pass gate 156 to step the next stage, and so produce effectively stepping at twice the rate which normal inputs via gate 70 produce. The significance of the state of the least significant stage will, of course, be lost by this; but since this will occur only when the content of companding counter 38 is already very great, this error will be negligible. This fact, however, limits the scope of this approach. It is, of course, possible to generalize it, particularly where the clock frequency is inadequate to follow some extraordinarily rapid signal variations. In such case a 1 in e.g. the second most significant stage might be caused to step the second least significant stage, and a 1 in the most significant stage might be caused to step the third least significant stage. This particular embodiment is, as has been indicated, representative of an approach likely to be required in somewhat unusual situations; but for those it is available.

Since the claim recitals must be somewhat generalized, the following definitions are provided to furnish antecedent for them. Shift register 56 together with gates 62, 64, 72 and 74, with buffers 66 and 76 constitute pulse sequence analysis means. Register 30 is obviously a digital storage means. Buffer 104 is the essential portion of companding counter registration function means, and counters 118 and 120, with buffers 108 and 110 and gates 112 and 114 comprise stepping impulse control means. Counters 118 and 120 function as stepping impulse counter means. Other claim recitals are believed to be adequately anteceded by the description of the preferred embodiments. The term "interconversion" has been employed to signify that the apparatus claimed is useful both in encoding amplitude-varying signals into incremental pulse modulation signals, and to decode incremental pulse modulation signals back into a representation of the amplitude-varying signals.

What is claimed is:

1. In apparatus for the interconversion of a first representation of an information signal by a time-varying amplitude with a second representation of the same information signal by a succession of pulse signals each having one of two possible logical significances which represent the sign of the change in the amplitude of the first representation since the occurrence of the last preceding pulse signal of the second representation, which comprises:

a source of clock pulses connected to herein subsequently recited pulse sequence analysis means, digital companding counter means, and adder means;
pulse sequence analysis means to receive the said pulse signals in sequence and to produce responsively thereto a first pulse sequence output signal when a first predetermined number of pulses in the sequence are all of the same logical significance and a second pulse sequence output signal when a second predetermined number of pulses in the sequence are of alternate logical significance;
digital companding counter means connected to be stepped to be increased in registration during the existence of a first pulse sequence output signal and to be decreased in registration during the existence of a second pulse sequence output signal;
adder means connected to receive the registration of the companding counter means and, responsively to a pulse signal of the second representation of first logical significance to add, and responsively to a pulse signal of the second representation of second logical significance to subtract, the registration of the companding counter means to and from the content of
digital storage means, which are connected to
digital to analogue converter means whose output is the said first representation;
the improvement which comprises:
companding counter control means comprising:
companding counter registration function means connected to registration outputs of the said companding counter, and, responsively thereto, to control
stepping impulse control means to step the companding counter means at a maximum rate when the companding counter registration is greater than a predetermined value and to step the companding counter means at a lower rate when the companding counter registration is not greater than the predetermined value.

2. The improvement claimed in claim 1 in which:
the companding counter registration function means comprises a buffer connected to receive as inputs the 1 outputs of at least one of the most significant digit stages of the companding counter means, and its output is connected to gate every stepping impulse to step the companding counter means, and
the stepping impulse control means comprises stepping impulse counter means which count all stepping impulses but gate to the companding counter to step it only those stepping pulses which occur at a predetermined registration of the said stepping impulse counter means.

3. The improvement claimed in claim 2 in which:
the companding counter registration function means comprises a plurality of buffers connected to receive as inputs the 1 outputs of differently significant adjacent groups of the most significant digit stages of the companding counter means;
the output of the said buffer which is connected to receive as inputs the 1 outputs of the most significant stages of the companding counter means is connected to gate every stepping impulse to step the companding counter means;
the output of any other buffer of the said plurality is connected to gate stepping pulses which occur at a predetermined registration of the stepping impulse counter means representative of less than the full counting capacity of the stepping impulse counter means.

4. The improvement claimed in claim 1 in which:
the stepping impulse control means is connected to step the companding counter means by applying stepping pulses to a stage of greater significance than the least significant stage when the companding counter registration is greater than a predetermined value.

5. The improvement claimed in claim 2 in which:
the stepping impulse counter means are connected to be reset to a zero registration by all those pulses which are gated to the companding counter means to step it.

* * * * *